United States Patent [19]

Wong

[11]  4,285,839

[45]  Aug. 25, 1981

[54] VARISTORS WITH UPTURN AT HIGH CURRENT LEVEL

[75] Inventor: Joe Wong, Schenectady, N.Y.

[73] Assignee: General Electric Company, Schenectady, N.Y.

[21] Appl. No.: 60,920

[22] Filed: Jul. 26, 1979

Related U.S. Application Data

[63] Continuation-in-part of Ser. No. 875,116, Feb. 3, 1978, abandoned.

[51] Int. Cl.³ ............................................... H01B 1/06
[52] U.S. Cl. .................................... 252/519; 252/518; 252/521; 252/512
[58] Field of Search ............... 252/518, 519, 521, 512; 106/73.2, 39.5, 73.4; 264/13, 61

[56] References Cited

U.S. PATENT DOCUMENTS

| | | | |
|---|---|---|---|
| 3,089,856 | 5/1963 | Cyr et al. | 252/518 |
| 3,264,229 | 8/1966 | Klein | 252/518 |
| 3,538,022 | 11/1970 | Bowman | 252/518 |
| 3,551,356 | 12/1970 | Bowman | 252/518 |
| 3,723,175 | 3/1973 | Masuyama et al. | 252/518 X |

Primary Examiner—Edward A. Miller
Assistant Examiner—J. L. Barr
Attorney, Agent, or Firm—Alexander M. Gerasimow; James C. Davis; Marvin Snyder

[57] ABSTRACT

A method for producing varistors and varistor powder is disclosed in which the zinc oxide powder is predoped with certain desired impurities in order to keep these impurities out of the intergranular phase which is known to exist in sintered metal oxide varistors. In particular, certain trivalent dopants are added to increase the zinc oxide grain conductivity without the usually concomitant increase in higher leakage current. In particular, the method disclosed herein is especially important for the doping of varistor material with aluminum at low levels of concentration.

16 Claims, 1 Drawing Figure

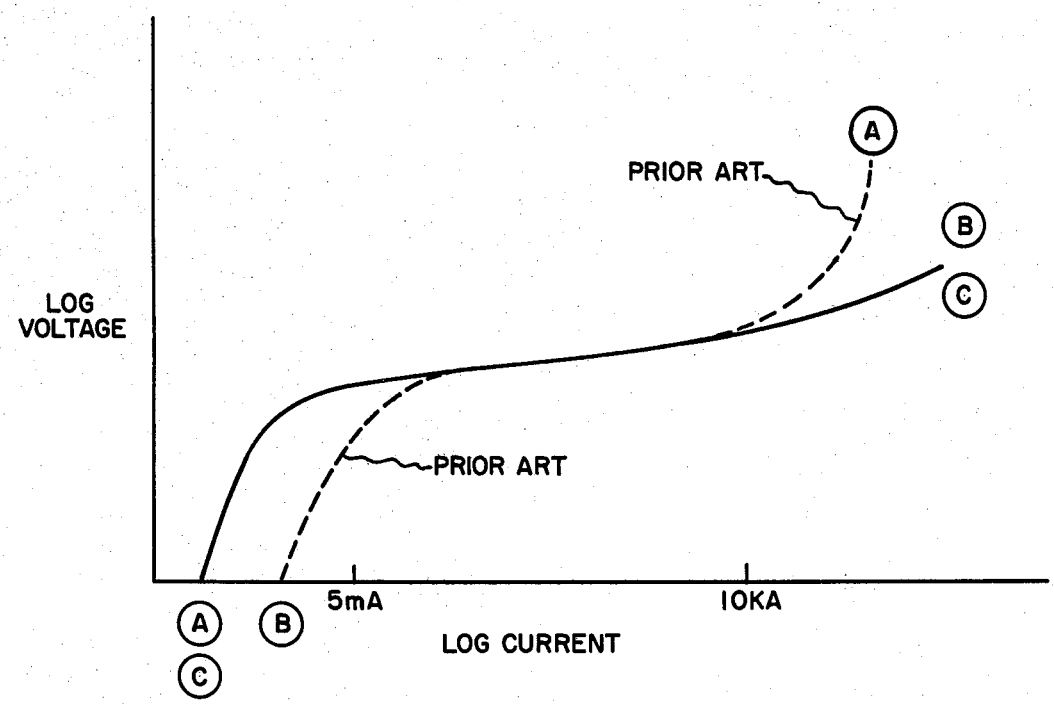

VARISTORS WITH UPTURN AT HIGH CURRENT LEVEL

This application is a continuation-in-part of application Ser. No. 875,116 filed Feb. 3, 1978, now abandoned.

BACKGROUND OF THE INVENTION

This invention relates to varistors and varistor powders used in the manufacture of metal oxide varistors. In particular, this invention relates to a method for adding dopants to the varistor in such a way that the dopants occur only in the zinc oxide grains and not in the intergranular phase of a sintered metal oxide varistor. Even more particularly, this invention relates to a method of doping metal oxide varistor powders with certain trivalent impurities so as to increase the conductivity of the zinc oxide grains without having these dopants present in the intergranular phase of sintered metal oxide varistors.

Metal oxide varistors are nonlinear electrical devices exhibiting a current-voltage characteristic expressed by the equation $$I = (V/C)^\alpha$$

where

I is the current flowing through the material,

V is the voltage across the material

C is constant which is a function of the physical dimensions of the device, its composition and the parameters of the processes employed to form the body, and, $\alpha$ is a constant for a given range of current and is a measure of the nonlinearity of the resistance characteristic of the varistor.

For voltage values below the breakdown voltage, the device behaves like an ohmic resistor of very large value (typically approximately 10,000 M$\Omega$), but when the breakdown voltage is exceeded, the device behavior is like that of a low resistance conductor. For a wide range of current values, the value of $\alpha$ is approximately constant. However, for certain large values of the varistor current the value of $\alpha$ is lower and there is a correspondingly high increase in the voltage across the device. This region of decreasing $\alpha$ value is referred to as the "upturn region". It is desirable to have this upturn region beginning at as high a current level as possible. In addition, it is desired to have the current level at which the varistor breakdown voltage occurs to be at as low a level as possible in order to minimize the problem of leakage current. A relatively high level of leakage current may not be a significant consideration in all varistor applications, but in those applications in which a standby voltage is present across the device, then the leakage current should be as small as possible to avoid unnecessary energy dissipation in the device. Thus, in general it is desirable that the range of current levels over which the varistor behaves nonohmically in accordance with the equation above, be as large as possible.

Certain trivalent dopants may be added to the varistor material which serve to increase the conductivity of the zinc oxide grains present in a sintered varistor. This increased conductivity has the effect of extending the upper limit of the current range at which the upturn region of the device is entered. However, in standard methods for adding this dopant to varistor materials, the dopants are added to the zinc oxide powder along with the other typical metal oxide additives. This method, however, results in the dopant, or dopants, being present in the intergranular phase of the sintered metal oxide varistor powder. The presence of such dopants in the intergranular phase, that is, between the sintered grains of zinc oxide, tends to increase the leakage current for the varistor. That is to say, when these dopants are added to the varistor powder in the usual fashion, the effect is simply to shift the voltage-current curve (as plotted in a log-log fashion) to the right without actually increasing the range of current values over which the varistor behaves nonohmically.

SUMMARY OF THE INVENTION

In accordance with one embodiment of the present invention, suitable compounds containing trivalent dopants, such as aluminum nitrate with its trivalent aluminum, are mixed in a suitable solvent, such as water in the case of aluminum nitrate, to form a solution with a desired degree of concentration of the dopant. To this solution is added pure zinc oxide powder also in an amount appropriate for the degree of doping concentration selected. This mixture is then thoroughly stirred to form a slurry. This slurry is then heated at a temperature of from approximately 500° C. to approximately 700° C. for approximately one-half hour to approximately eight hours in order to cause a thermal diffusion of the dopant into the zinc oxide particles. The heating step drives off any remaining solvent and the resulting doped zinc oxide powder is then mixed with the typical metal oxide varistor additives, such as bismuth oxide, cobalt oxide, manganese oxide, tin oxide and antimony oxide, or other desired additives. This varistor powder is then sintered in the usual modes for varistor sintering, at temperatures from approximately 900° C. to approximately 1400° C. for approximately one hour to approximately twelve hours. In this fashion, the dopants are prediffused into the zinc oxide particles and their occurrence in the intergranular phase is minimized.

In particular, aluminum nitrate is added to a water solvent to which zinc oxide is added to form a slurry which is presintered to cause the thermal diffusion of aluminum ions into the zinc oxide particles. At a dopant level of approximately 5 to 15 parts per million by atom of aluminum, the resulting varistor powder and resulting varistor exhibit an upturn region occurring at a higher current level than without doping without a corresponding increase in the leakage current for the varistor.

Accordingly, it is an object of this invention to provide a method of predoping of the zinc oxide used in metal oxide varistor powders without also having the dopant present in the intergranular phase of the sintered varistor powder.

It is a further object of this invention to provide a metal oxide varistor with improved upturn characteristics without sacrificing the leakage characteristics of the device.

DESCRIPTION OF THE DRAWING

The FIGURE is a log-log plot of the varistor voltage versus the varistor current under three conditions:

(A) no dopants present;

(B) dopants added by prior art methods;

(C) dopants added by methods of the present invention.

DETAILED DESCRIPTION OF THE INVENTION

As described above, the invention herein relates to a method of predoping zinc oxide powder with desired dopants at selected levels of concentration so as to produce a varistor with the dopants only substantially present in the zinc oxide grains and substantially absent from the intergranular phase of the zinc oxide varistors.

There may be several reasons why it is desired to have the dopant present only in the zinc oxide powder, but in particular herein, it is desired to have the dopant present only in the zinc oxide grains (or at least only substantially therein) to increase the conductivity of the zinc oxide grains while at the same time, maintaining the same degree of conductivity in the intergranular phase of the varistor. In particular, various trivalent dopants may be used to increase the zinc oxide grain conductivity, such as aluminum, gallium, indium and the trivalent rare earths.

The FIGURE is a log-log plot of the voltage-current characteristic for three different kinds of varistor. Curve A, as shown in the FIGURE, illustrates the voltage-current characteristic for a typical undoped varistor. That segment of the characteristic above approximately 5 ma is referred to as the "breakdown region." That portion of the characteristic above approximately 10 Ka is referred to as the "upturn region." In this upturn region, the voltage-current characteristic deviates from that given by the equation above, which deviation is often characterized by saying that the value of α varies with the current. But, in any event, this upturn region is undesirable. As of yet, no way has been found to completely eliminate this upturn region, but it is possible, by the addition of various dopants, to shift this upturn region to the right along the characteristic shown so that the upturn region occurs at higher current levels. Curve B in the FIGURE illustrates the effects of prior art doping techniques used to shift this upturn region farther out along the voltage-current characteristic. Typically, this is done by doping the entire varistor powder mixture with various concentrations of trivalent compounds, such as aluminum, gallium, and indium. However, as can be seen on Curve B, the upturn region is shifted to the right, but so is that portion of the characteristic below the breakdown region with the net result that the entire voltage-current characteristic appears to be shifted to the right, that is, in the direction of increasing current. This is a particularly deleterious result in those varistor applications in which the varistor is subjected to the continuous presence of a standby voltage, for which case the improvement in the upturn portion of the characteristic occurs at the cost of a large increase in the leakage current across the varistor.

It is thought that the presence of these trivalent dopants, which are added to the raw varistor powder and which are also found present in the intergranular phase of the sintered varistor powder, is the cause for this increased leakage current. Therefore, this invention provides a method in which all, or at least substantially all, of the dopant is present in the zinc oxide grains of the sintered varistor and substantially absent from the intergranular phase of the sintered varistor.

The invention of predoping the zinc oxide powder itself acts to increase the concentration of dopant in the zinc oxide grains and correspondingly to reduce the dopant level in the intergranular phase. The present invention is applicable to any zinc oxide grain dopant. Certain of these dopants include those which act to increase the electrical conductivity of the zinc oxide grains. As is well known in the semiconductor arts, conductivity of crystalline materials may be increased by causing certain atomic substitutions in the crystal lattice structure. The substitutions are generally chosen to increase the supply of available electrons. For example, some zinc atoms in the zinc oxide crystal may be replaced by atoms exhibiting valance states higher than the +2 state exhibited by zinc. Doping the ZnO to increase grain conductivity in ZnO-based varistors may be accomplished substitutionally at ZnO sites with Group III metal ions in the oxide form according to:

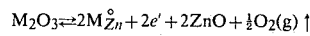

where $M_{Zn}^o$ is $M^{+++}$ at a normal $Zn^{++}$ site and $e'$ is a quasifree electron in the conduction band which is directly responsible for enhanced free carrier concentration and hence to increased conductivity. M is Al, In, Ga or a trivalent rare earth, particularly those with ionic radius compatible to that of the $Zn^{++}$ ion (i.e., 0.74 Å). In other words, the substitution of $M^{+++}$ at a normal $Zn^{++}$ site acts to convert a $Zn^{++}$ ion to a $Zn^+$ ion in order to maintain electrical neutrality. This $Zn^+$ ion produces a donor level near the conduction band.

Likewise, certain anions may be substituted for the oxygen ions in the zinc oxide crystal lattice to increase the electrical conductivity, for example, $F^-$. The $F^-$ ion is an ideal anion dopant in oxide lattices since it has an ionic radius (1.36 Å) similar to the ionic radius of $O^=$ (1.40 Å), implying that little or no strain results from lattice mismatch. The reaction in ZnO is written as:

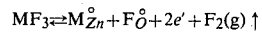

where $F_O^o$ is an $F^-$ ion at a normal oxide site in the ZnO lattice.

In either event, the number of electrons available for electrical conduction is increased. However, it is also to be noted that because of other considerations, such as ionic radius, certain trivalent elements such as iron do not, in fact, act to significantly increase the zinc oxide grain conductivity when these elements are employed as dopants. Thus, as used here and in the appended claims, the term "conductivity-increasing dopant" means those materials such as indicated above, which act to increase the electrical conductivity of zinc oxide grains; a dopant which may itself be conductive is not such a conductivity-increasing dopant unless it acts to increase the zinc oxide grain conductivity. It should also be noted that the above-mentioned cationic doping with trivalent elements is desirably employed with simultaneous anionic doping accomplished, for example, with the above-described halogen type elements.

In accordance with the method of the present invention, the dopant is dissolved in a suitable solvent. It is to be noted that the term "dopant" as used herein and in the appended claims is meant either the dopant itself or a suitable compound containing the dopant. For example, if the selected dopant is aluminum, gallium, or indium, the dopant may be supplied by adding instead a suitable salt or oxysalt of the desired dopant such as, for example, aluminum nitrate, gallium nitrate, or indium nitrate. The choice of a solvent is not critical, but the solvent must be one that is capable of dissolving a sufficient amount of the dopant and should also be a solvent that is not reactive with zinc oxide. In addition, it should be relatively easy to remove the solvent from the slurry mixture to be described immediately below.

After the dopant is dissolved in the solvent, a slurry is formed by thoroughly mixing zinc oxide powder with the solvent in those amounts needed to achieve the desired concentration of dopant with respect to the zinc oxide. In those cases in which there are low levels of dopant concentration, it is desired that the zinc oxide powder be thoroughly mixed with the doped solvent, preferably by day-long stirring, to insure a homogeneous mixture.

The solvent is then removed from the slurry mixture, leaving the zinc oxide powder particles coated with the dopant. Typically, the solvent is removed through thermal evaporation, evaporation by vacuum suctioning or through spray drying. This is particularly effective if the solvent is water. The use of water as a solvent is preferable in those cases in which the dopant is aluminum nitrate, gallium nitrate, or indium nitrate. However, other methods of solvent removal may be employed.

The dopant-coated zinc oxide powder is then heated to cause a thermal diffusion of the dopant into the zinc oxide powder particles. However, there is a limit to the range of temperatures which prove to be useful. In particular, the temperature should not be so high as to initiate zinc oxide grain growth. These high temperatures should be reserved for the sintering step of varistor manufacture. On the other hand, the temperature should be sufficiently high as to cause the thermal diffusion of the dopant into the zinc oxide powder particles. Obviously, there is available the trade-off here of time versus temperature. That is to say, sufficient thermal diffusion of the dopant may be accomplished by utilizing lower temperatures over a greater length of time. Also, the temperature of this heating step may be increased, but not to a temperature high enough to initiate zinc oxide grain growth, to accomplish the thermal diffusion in a shorter period of time. It has been found that a suitable temperature range is between approximately 500° C. and approximately 700° C. Within this temperature range, it has also been found that a suitable range of heating times lies between approximately one-half hour and approximately eight hours.

This doped zinc oxide powder is then mixed with suitable amounts of the other metal oxide varistor additives that are commonly employed, such as bismuth oxide, cobalt oxide, manganese oxide, tin oxide and antimony oxide. It is this varistor powder doped in this novel fashion that is used to form varistors in the usual prior art sintering processes. For example, typical varistors are formed by sintering this novel powder at temperatures of between approximately 900° C. and approximately 1,400° C. for between approximately one hour and approximately twelve hours.

By way of example, and not by way of limitation, a suitable varistor powder may be formed from a mixture of one-half mole percent bismuth oxide, one-half mole percent cobalt oxide, one-half mole percent manganese oxide, one-half mole percent tin oxide, and one mole percent antimony oxide, the remaining balance being composed of the predoped zinc oxide powder. Prior art varistor patents describe a number of other possible additives, such as silicon dioxide, and it is not here intended to so limit the additives used in such metal oxide varistors to those listed above.

Before describing a more particular example in which aluminum doping is used, we now define a term referred to as the "voltage clamp ratio," which serves as a suitable measure for comparing both the upturn and leakage characteristics of metal oxide varistors. In particular, herein, the voltage clamp ratio is defined as the ratio of the voltage at a specified current level to the voltage at one milliampere. The two specified current levels used herein are the two amp and the ten amp levels. Thus, we may define a $R_2$ as follows:

$$R_2 = (V_{2\ a}/V_{1\ ma}).$$

Similarly, the voltage clamp ratio, $R_{10}$ at 10 amps is defined as:

$$R_{10} = (V_{10\ a}/V_{1\ ma}).$$

Since one of the characteristics of varistors that is of prime importance is its ability to clamp the voltage across it at a designed for level, the ideal value for the voltage clamp ratios, $R_2$ and $R_{10}$ is 1.0. However, in practice, this is not achieved, but in general the better devices have a voltage clamp ratio as close to 1 as possible. Typical values for this ratio are discussed below.

From the FIGURE it is seen when the leakage portion of the curve is shifted to the right, as occurs on Curve B, then the denominator portion of the voltage clamp ratio is decreased, thereby increasing the voltage clamp ratio. The increase in the voltage clamp ratio and the shift to the right of the portion of the voltage current characteristic below the breakdown voltage are both undesirable results. Similarly, the FIGURE shows that when the upturn portion of the curve is shifted to the left (that is, occurs at lower current levels) then the numerator portion of the voltage clamp ratio is increased, thereby increasing the voltage clamp ratio itself. It is in this sense, then, that the voltage clamp ratio serves as a figure of merit for the improvements sought by the invention herein.

By way of example, and not by way of limitation, aluminum is added as a predopant to the zinc oxide powder in the following fashion. Hydrated aluminum nitrate $(Al(NO_3)_3.9H_2O)$ is added to water as a solvent. Zinc oxide powder is then added to form a water slurry with a nominal doping level of 10 parts per million by atom of aluminum. The slurry is stirred well overnight and the water solvent is gently evaporated off by vacuum suction. The resultant nitrate coated powder is then calcined at 500° C. for one hour to cause thermal diffusion of the aluminum into the zinc oxide. The aluminum doped zinc oxide powder is then used to make up a relatively standard varistor powder composition comprising one mole percent antimony oxide, one-half mole percent tin oxide, one-half mole percent manganese oxide, one-half mole percent cobalt oxide, and one-half mole percent bismuth oxide. The balance is composed of the predoped zinc oxide powder. This powder is then used to produce metal oxide varistors according to standard processes. If aluminum is added as a normal additive with no predoping by calcining, a conventional but less desirable varistor results. In particular, $R_2$ for the conventionally produced varistor is 1.37, while $R_2$ for the varistor produced in accordance with the invention herein is 1.29, an improvement of approximately 5.5% in the voltage clamp ratio. Similarly, $R_{10}$ for a conventionally doped varistor is 1.55, while $R_{10}$ for a varistor produced by the predoping method herein is 1.42, an improvement of approximately 8.4% in the voltage clamp ratio.

It is to be noted that this calcining temperature used in predoping is at least somewhat critical in that when calcination occurs at approximately 1000° C., little or no improvement in voltage clamp ratio is observed. This is due to the sintering of the zinc oxide which is known to grain grow from 0.5 $\mu$ to 10 $\mu$ at 1000° C.

While the example above illustrates a doping level of approximately 10 parts per million by atom of aluminum, the actual amount of aluminum doping in this method may vary from approximately 5 parts per million to approximately 15 parts per million by atom of aluminum.

It can therefore be appreciated from the above that what is described is a novel process for producing metal oxide varistor powders with desired dopants present substantially only in the zinc oxide grains themselves, rather than in the intergranular phase of the varistor. In particular, it can be appreciated that this invention provides a novel process for aluminum doping of varistors to produce significant improvements in the voltage clamp ratio.

While this invention has been described with reference to particular embodiments and examples, other modifications and variations will occur to those skilled in the art in view of the above teachings. Accordingly, it should be understood that, within the scope of the appended claims, the invention may be practiced otherwise than as specifically described.

The invention claimed is:

1. A method of producing doped zinc oxide varistor powder useful in forming sintered varistors comprising the steps of:
   (A) dissolving a conductivity increasing dopant in a solvent;
   (B) forming a slurry by thoroughly mixing zinc oxide powder with the solvent containing the dopant to the extent necessary to achieve the selected concentration of dopant;
   (C) removing the solvent from the slurry, whereby the zinc oxide powder particles are coated with the dopant; and
   (D) heating the coated zinc oxide powder particles for a time and at a temperature sufficient to cause thermal diffusion of the dopant into the zinc oxide powder particles, but not at a temperature high enough to initiate zinc oxide grain growth.

2. The method of claim 1 in which the solvent is removed through evaporation by vacuum suctioning.

3. The method of claim 1 in which the solvent is removed by thermal evaporation.

4. The method of claim 1 in which the solvent is removed by spray drying.

5. The method of claim 1 in which the dopant is a trivalent material selected from the group consisting of aluminum, gallium, indium, and the trivalent rare earths.

6. The method of claim 1 in which the dopant is aluminum in the form of hydrated aluminum nitrate and the solvent is water.

7. The method of claim 6 in which the amounts of aluminum nitrate and zinc oxide are chosen to produce a concentration of aluminum of between approximately 5 and approximately 15 parts per million by atom.

8. The method of claim 1 in which the slurry in step D is heated to a temperature of between approximately 500° C. and approximately 700° C. for between approximately one-half hour to approximately eight hours.

9. The method of claim 1 further comprising the step of:
   (E) mixing the dopant diffused zinc oxide powder particles with selected amounts of selected metal oxide varistor additives.

10. The method of claim 1 in which the metal oxide varistor additives are selected from the group consisting of silicon dioxide, bismuth oxide, cobalt oxide, manganese oxide, tin oxide, and antimony oxide.

11. The predoped zinc oxide varistor powder made in accordance with claim 8.

12. The predoped zinc oxide varistor powder made in accordance with claim 1.

13. A method of producing doped metal oxide varistors comprising the steps of:
   (A) dissolving a conductivity-increasing dopant in a solvent;
   (B) forming a slurry by thoroughly mixing zinc oxide powder with the solvent containing the dopant to the extent necessary to achieve the selected concentration of dopant;
   (C) removing the solvent from the slurry, whereby the zinc oxide powder particles are coated with the dopant;
   (D) heating the coated zinc oxide powder particles for a time and at a temperature sufficient to cause thermal diffusion of the dopant into the zinc oxide powder particles, but not at a temperature high enough to initiate zinc oxide grain growth;
   (E) mixing the dopant diffused zinc oxide powder particles with selected amounts of selected metal oxide varistor additives; and
   (F) sintering the varistor powder from step E at a temperature of between approximately 900° C. and approximately 1000° C. for between approximately one and approximately twelve hours.

14. The varistor produced in accordance with the method of claim 13.

15. A sintered zinc oxide varistor comprising:
   a granular phase composed substantially of zinc oxide grains;
   an intergranular phase; and
   a conductivity-increasing dopant contained substantially within said granular phase and being substantially absent from said intergranular phase.

16. The varistor of claim 15 in which the dopant is selected from the group consisting of aluminum, indium, and gallium.

* * * * *